Aug. 8, 1950 — R. L. HATCH — 2,517,874
SELF-ACTING TRASH RAKE
Filed Feb. 1, 1946

INVENTOR.
Robert L. Hatch

Patented Aug. 8, 1950

2,517,874

UNITED STATES PATENT OFFICE 2,517,874

SELF-ACTING TRASH RAKE

Robert L. Hatch, Orange, Mass., assignor to Rodney Hunt Machine Company, Orange, Mass., a corporation of Massachusetts Application February 1, 1946, Serial No. 644,813

2 Claims. (Cl. 56—400.01)

1

This invention relates to trash rakes for use in cleaning trash racks or screens in water canals, at the intake or a sluice way, or similar installation.

Trash rakes of the class described must be of particularly strong and heavy construction and are generally made of steel or cast iron so that when the rake gets away from the operator it is lost in the water because it sinks quickly even though the rake head may be mounted on an ordinary solid wood handle. It is the principal object of this invention to provide a trash rake of the class described which floats and thus cannot become lost in the water, while at the same time the rake is just as strong as the rakes of the prior art.

Further objects of the invention include the provision of a trash rake of the class described provided with a hollow handle to make the rake float; the provision of a trash rake having a hollow handle imparting a buoyancy to the rake such that the latter will float vertically with the handle end thereof exposed in part above the water, whereby the operator may let the rake sink itself about five feet in the water, whereupon a slight extra push will bring the rake head to the bottom of the screen to be cleaned, and the buoyancy of the rake will thereupon assist in raising it, so that the operator is enabled to perform the cleaning of the screen more easily and quickly and with much less effort than is possible with rakes of the prior art.

Other objects and advantages of the invention will appear hereinafter.

Reference is to be had to the accompanying drawings, in which

Figure 1:
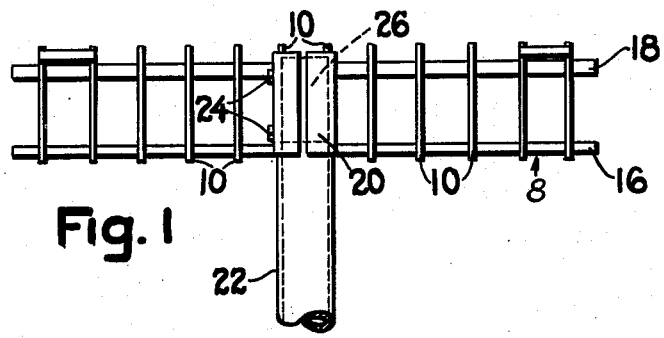
Fig. 1 is a top plan view of the rake.
Figure 2:
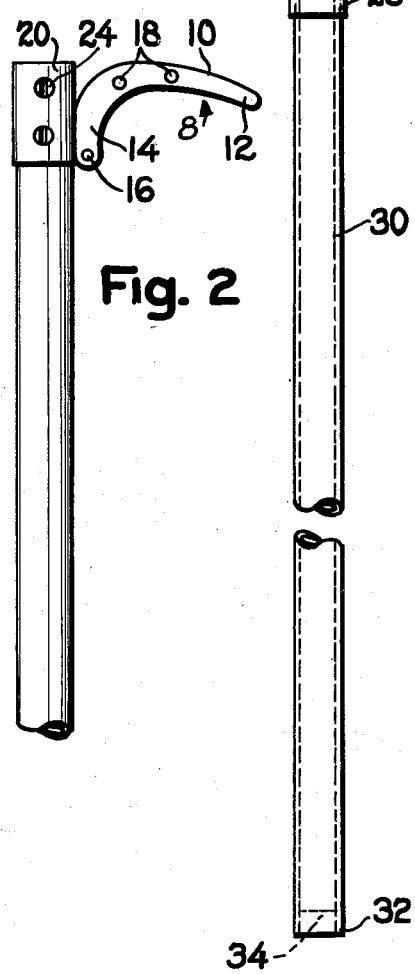
Fig. 2 is a view in side elevation with the handle broken away.
Figure 3:
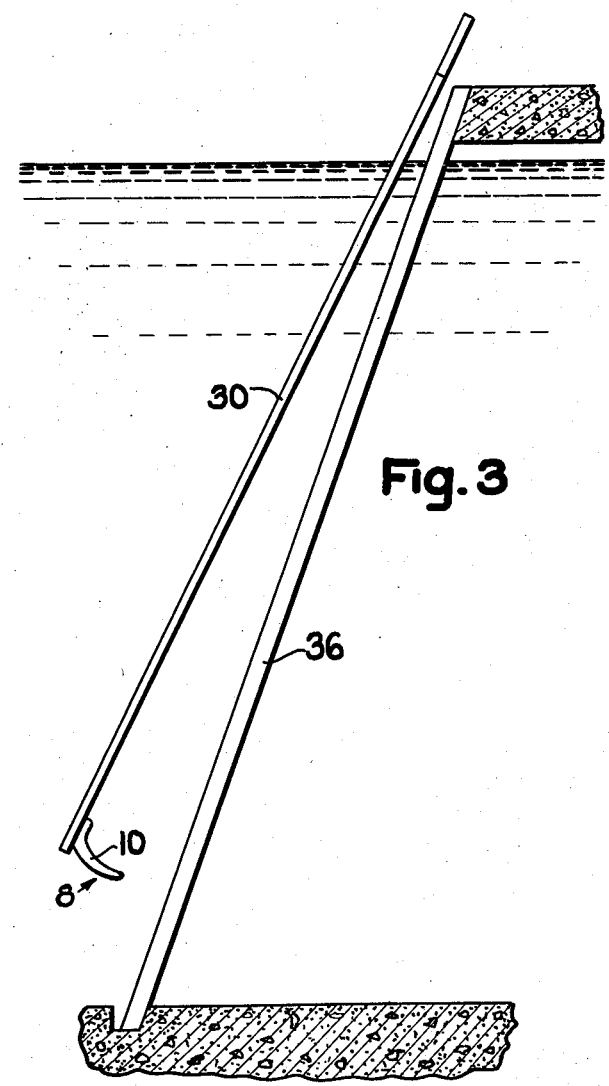
Fig. 3 illustrates the use of the rake in cleaning a screen or trash rack.

The head 8 of the rake comprises a series of steel fingers 10 each of which is in the form shown in Fig. 2 having free ends 12 and opposite ends 14, the latter accommodating a connecting rod 16 passing through the fingers securing the same together in spaced relation. A pair of larger rods 18 serves the same purpose and strengthens the rake at spaced points along the fingers.

Centrally located fingers 10 are secured to a hollow split cylinder 20. This cylinder receives a hollow handle element 22 which is secured to the cylinder by a pair of fasteners 24. The hollow handle element 22 is plugged at the rake head thereof by means of a plug 26 and terminates at 28, receiving a narrower handle element 30, the latter terminating at 32. The end 32 is also plugged as at 34.

The hollow handle elements 22 and 30 may be of any material desired but it is preferred that

2 these elements be made of wood such as tubular plywood for strength and increased buoyancy, it being understood that the plugs 26 and 34 are water tight and insure that the hollow handle of the rake will not admit water. It is also to be noted that the buoyancy of the handle balances the weight of the iron or steel rake head, and this balance is designed so that if the rake is dropped in the water it will float vertically with the rake head down and the handle element 30 extending a foot or two above the surface of the water.

In Fig. 2 there is shown a trash rack or screen 36 anchored as usual in a water canal or any kind of intake waterway or sluice. The rake easily lowers itself to the level shown without effort on the part of the operator and the head 8 may then be pushed to the bottom of the trash rack with very little effort, whereupon the operator may raise the rake easily and quickly to the surface of the water to clean the trash rack with very little effort as compared with conventional iron or steel rakes, even though the latter should be provided with wooden handles. It will be seen that the present invention provides a rake of the class described which will not sink even though it has a heavy head and which is much easier to use than rakes of the prior art.

Having thus described my invention and the advantages thereof, I do not wish to be limited to the details herein disclosed, otherwise than as set forth in the claims, but what I claim is:

1. A trash rake for cleaning submerged water wheel screens comprising a metal head provided with teeth, a handle secured at one end to said head, said handle comprising an elongated, hollow, rigid, water tight tube having water tight plugs in the ends thereof, said handle being sufficiently buoyant in water that the rake will normally float with a portion of the end of the handle above the surface of the water, whereby the weight of said rake is substantially neutralized during cleaning of a water wheel screen.

2. A trash rake as defined in claim 1 in which the handle is formed of tubular plywood.

ROBERT L. HATCH.

REFERENCES CITED

The following references are of record in the file of this patent:

UNITED STATES PATENTS

| Number | Name | Date |
|--------|------|------|
| 208,749 | McCann | Oct. 8, 1878 |
| 576,756 | Cole | Feb. 9, 1897 |
| 680,885 | Pool | Aug. 20, 1901 |
| 684,868 | Robinson | Oct. 22, 1901 |
| 1,162,055 | Harris | Nov. 30, 1915 |
| 1,705,441 | Cramer | Mar. 12, 1929 |
| 1,740,560 | Andrews | Dec. 24, 1929 |